United States Patent
Aybay

[19]

[11] Patent Number: 6,052,368
[45] Date of Patent: Apr. 18, 2000

[54] METHOD AND APPARATUS FOR FORWARDING VARIABLE-LENGTH PACKETS BETWEEN CHANNEL-SPECIFIC PACKET PROCESSORS AND A CROSSBAR OF A MULTIPORT SWITCH

[75] Inventor: Günes Aybay, Sunnyvale, Calif.

[73] Assignee: Cabletron Systems, Inc., Rochester, N.H.

[21] Appl. No.: 09/084,081

[22] Filed: May 22, 1998

[51] Int. Cl.[7] .................................................. H04L 12/50
[52] U.S. Cl. .......................... 370/357; 370/380; 709/240
[58] Field of Search .................................... 370/357, 358, 370/366, 380, 384, 388, 389, 415, 427, 395, 393, 235; 340/825.5; 709/240

[56] References Cited

U.S. PATENT DOCUMENTS

| | | | |
|---|---|---|---|
| 4,704,606 | 11/1987 | Hasley | 340/825.5 |
| 5,081,575 | 1/1992 | Hiller et al. | 395/325 |
| 5,390,173 | 2/1995 | Spinney et al. | 370/393 |
| 5,590,123 | 12/1996 | Lyles et al. | 370/397 |
| 5,898,692 | 4/1999 | Dunning et al. | 370/427 |
| 5,905,873 | 5/1999 | Hartmann et al. | 370/389 |
| 5,974,467 | 10/1999 | Haddock et al. | 709/240 |

*Primary Examiner*—Hassan Kizou
*Assistant Examiner*—John Pezzlo
*Attorney, Agent, or Firm*—Law Offices of Mark A. Wilson; Mark A. Wilson

[57] ABSTRACT

A method and apparatus for forwarding variable-length packets between channel-specific packet processor in a crossbar of a multiport switch involve segmenting variable-length packets into fixed-length payload segments and multiplexing the payload segments with response or request data to form fixed-length switching blocks. The fixed-length switching blocks are transferred to and from the crossbar over respective input and output connections in order to minimize the number of connections between the packet processors and the crossbar. The input and output connections enable the transfer of a current packet through the crossbar while supplying the crossbar with request information necessary to schedule subsequent packets through the crossbar. In a preferred embodiment of the invention, packets are timed to pass through the crossbar one after another in order to utilize the maximum bandwidth of the crossbar.

20 Claims, 11 Drawing Sheets

METHOD AND APPARATUS FOR FORWARDING VARIABLE-LENGTH PACKETS BETWEEN CHANNEL-SPECIFIC PACKET PROCESSORS AND A CROSSBAR OF A MULTIPORT SWITCH

TECHNICAL FIELD

The invention relates generally to a high bandwidth multiport switch, for instance as used in gigabit ethernet networks. More particularly, the invention relates to the forwarding of variable-length packets through the crossbar of a multiport switch.

BACKGROUND OF THE INVENTION

Networks are widely used to transfer voice, video, and data between various network devices such as telephones, televisions, and computers. Data transmitted through a network is typically segmented into finite portions. Under some network protocols, data is segmented into fixed-length cells. For example, asynchronous transfer mode (ATM) protocol requires data to be segmented into 53-byte cells, with 5 bytes of each cell designated for a header and 48 bytes of each cell designated for payload. Other network protocols, such as ethernet, allow data to be segmented into variable-length packets. For example, an ethernet packet has a 14-byte header and a payload size that can vary from 64 bytes to 1,500 bytes.

Transmitting fixed-length cells, such as ATM cells, through a network device such as a switch is made easier by the fact that each cell is the same size and by the fact that each cell can be switched independently of any other cell, even if a group of cells is from the same source and headed to the same destination. Because ATM cells are all of a fixed length, the time for propagation of each cell through a switch is predictable. Knowing the time required for an ATM cell to propagate through a switch makes it easy to arrange for cells to pass through the switch one after another in a pipelined fashion, where pipelined or pipelining are terms used to describe a group of data units that are transferred over a single data path in series with no gap between the data units.

In contrast to protocols that require fixed-length data segments, protocols such as ethernet that include variable-length data segments are more difficult to pipeline data within a switch because the time required for the segment to pass through the switch is unpredictable. In order to make switching of variable-length packets more manageable, variable-length packets can be further segmented into fixed-length switching blocks that pass through the crossbar of the switch in a fixed amount of time. The fixed-length switching blocks have a header portion and a payload portion and the number of fixed-length switching blocks per packet is directly related to the size of the packet. The fixed-length switching blocks are only used internally by the switch and the switching blocks related to a particular packet are typically forwarded through the switch one after another.

Since the number of switching blocks for a particular packet depends on the size of the packet, the time required to forward variable-length packets through a switch varies. The varying time required to forward a packet through a switch makes it more difficult to pipeline one variable-length packet after another through a switch. In addition to the timing problems created by variable-length packets, various system timing delays related to, for example, scheduling arbitration and the retrieval of packets from buffers, increase the difficulty of determining when to start the process of supplying subsequent packets to a switch crossbar.

One example of a technique commonly used to pipeline variable-length packets through a switch involves providing multiple physical connections on a channel-by-channel basis between input buffers and the crossbar of a switch. Referring to FIG. 1, in a four-channel switch fabric, there are four connections between each packet processor 2, 4, 6, and 8 and a crossbar 10. For example, there may be separate input and output connections between the packet processors and the crossbar for transmitting the payload portion of a switching block and there may be separate input and output connections between the packet processors and the crossbar for transmitting the request and response portions of the switching block header. While the described technique may work well for its intended purpose, requiring four physical connections for each switching channel increases the number of signal pins required on the crossbar integrated circuit (IC) and limits the number of signal pins that can be used for other functions.

Another example of a technique used to forward variable-length packets through a switch involves providing large buffers in the switch fabric, so that packets can be forwarded through the switch fabric one after another until the buffers are full, without regard to the availability of target output channels. While this technique works well for its intended purpose, again the additional buffers in the switch fabric occupy valuable space on the integrated circuits that make up the switch.

In view of the efficiencies gained by pipelining variable-length packets and the added complexity of prior art solutions, what is needed is a method for communicating within a switch that accounts for timing delays and enables the pipelining of variable-length packets while requiring a minimum number of physical connections.

SUMMARY OF THE INVENTION

A method and apparatus for forwarding variable-length packets between channel-specific packet processors and a crossbar of a multiport switch involve multiplexing payload data with response or request data into switching blocks that are transferred to and from the crossbar over respective input and output connections in order to minimize the number of connections between the packet processors and the crossbar and to enable the transfer of a current packet through the crossbar while preparing the transfer of subsequent packets through the crossbar. In an additional aspect of the invention, packets are timed to pass through the crossbar one after another in order to utilize the maximum bandwidth of the crossbar.

To minimize the number of connections between the packet processors and the crossbar, the packet processors segment the incoming variable-length packets into fixed-length payloads and then multiplex the fixed-length payloads with request information related to a subsequent packet that is awaiting transfer through the crossbar. The input packet processors create fixed-length switching blocks that are transferred to the crossbar over a single data connection instead of two separate connections, one each for the payload and the request. At the crossbar, fixed-length payloads are multiplexed with response information related to a subsequent packet that is awaiting transfer through the crossbar to create fixed-length switching blocks. The switching blocks containing a payload and a response are transferred to the packet processors over a single data connection instead of two separate connections. A new packet can be ready for transfer through the crossbar as soon as the current packet is transferred through the crossbar.

To enable the transfer of packets with one immediately following another, the time interval from the issuance of a request from an input packet processor to the arrival at the crossbar of the first switching block related to the request is measured so that a new packet can be ready for transfer through the crossbar as soon as the current packet is transferred through the crossbar. In an additional aspect of the invention, data identification information specific to a payload of a switching block that is currently being transferred is multiplexed with the payload in order to identify the end of the current variable-length packet transfer. The data identification information includes a cell sequence vector that identifies how many switching blocks remain from a current packet transfer. Because the time interval between issuance of a request and arrival of a related packet at the crossbar is known and because the time required to transfer the remaining switching blocks through the crossbar can be determined from the cell sequence vector, communications between the input packet processors and the crossbar can be tuned such that packets are transferred through the crossbar one after another with no decline in crossbar utilization between packets.

In the preferred embodiment, the switch architecture includes channel-specific input packet processors, channel-specific output packet processors, and a crossbar. The input packet processors manage packet traffic to the crossbar. Specifically, the input packet processors receive packets in their original variable-length format and then segment the variable-length packets into fixed-length payloads which are multiplexed with requests to form switching blocks that are sent to the crossbar via channel-specific unidirectional data paths.

The crossbar preferably consists of channel modules, a data path multiplexer, and a scheduler. The channel modules are channel-specific devices that are responsible for demultiplexing and multiplexing response or request command portions of switching blocks. For a switching block coming from an input packet processor to a channel module, the request command is demultiplexed from the switching block and sent to the scheduler. For a switching block going from a channel module to an output packet processor, a response command generated from the scheduler is multiplexed into a switching block and sent to the output packet processor. The data path multiplexer of the crossbar is connected to all of the channel modules and provides the physical path for transferring the payload and data identification portions of the switching blocks between channels of the crossbar. The scheduler of the crossbar is connected to all of the channel modules and utilizes the request command portions of the switching blocks transferred from the channel modules to manage traffic through the data path multiplexer in a manner that maximizes the throughput of the switching blocks without unfairly delaying any particular switching block. The scheduler arbitrates among multiple request commands and then generates a response command. The response command identifies when a grant has been issued to a packet that is awaiting transfer through the crossbar.

The output packet processors receive fixed-length switching blocks from the crossbar via channel-specific unidirectional paths and reassemble the payload portions of the original variable-length packets for transfer out of the switch. The output packet processors are connected to the input packet processors via bypass data paths that allow messaging information to be transferred from the crossbar to the input packet processors.

In order to completely pipeline packet transfers, the crossbar must know the total delay time from the issuance of a request from an input packet processor to the arrival of the switching block that is related to the request at the crossbar. Once the delay time is known, the system can be tuned such that a request for a new packet is issued from an input packet processor in sufficient time to allow a switching block related to the request to arrive at the crossbar just after the last switching block from the current packet transfer passes into the crossbar.

In a preferred case where a fixed-length switching block passes through the crossbar in eighteen clocks, the total delay from issuance of a request to arrival of a switching block is adjusted to be equal to three times the number of clocks required to transmit one switching block. The number of switching blocks from the current transfer passing through the crossbar can then be monitored utilizing the cell sequence vector such that a new request related to the next packet is issued from the input packet processor at the point when there are three switching blocks remaining from the current packet transfer. The request process is timed such that switching blocks for the new request are sent to the crossbar right after the current packet transfer is complete.

An advantage of the invention is that pipelining of packets through the crossbar and scheduling of subsequent packets is accomplished using only one input connection and one output connection between the packet processing units and the crossbar, thereby minimizing the number of connections needed between the packet processing units and the crossbar while allowing maximum bandwidth utilization. With a minimum number of connections utilized on the crossbar, pin connections required on the crossbar IC are minimized. Another advantage of the invention is that excess buffers are not needed within the crossbar to store packets waiting for available output channels.

DETAILED DESCRIPTION

Figure 1:
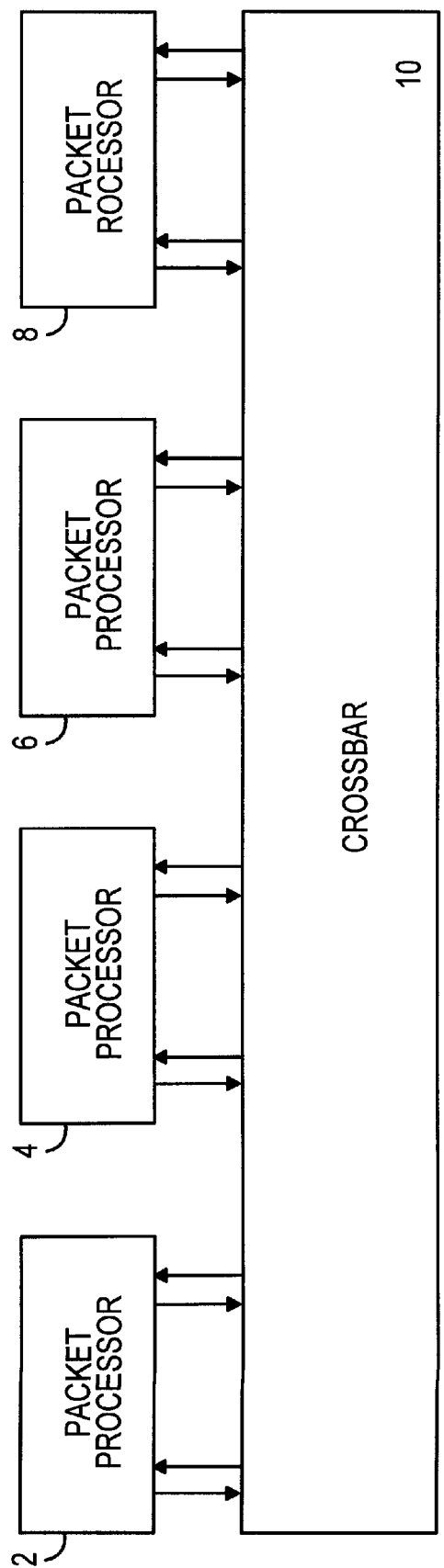
FIG. 1 is a depiction of a four-channel switch fabric with multiple input and output connections between packet processors and a crossbar in accordance with the prior art.
Figure 2:
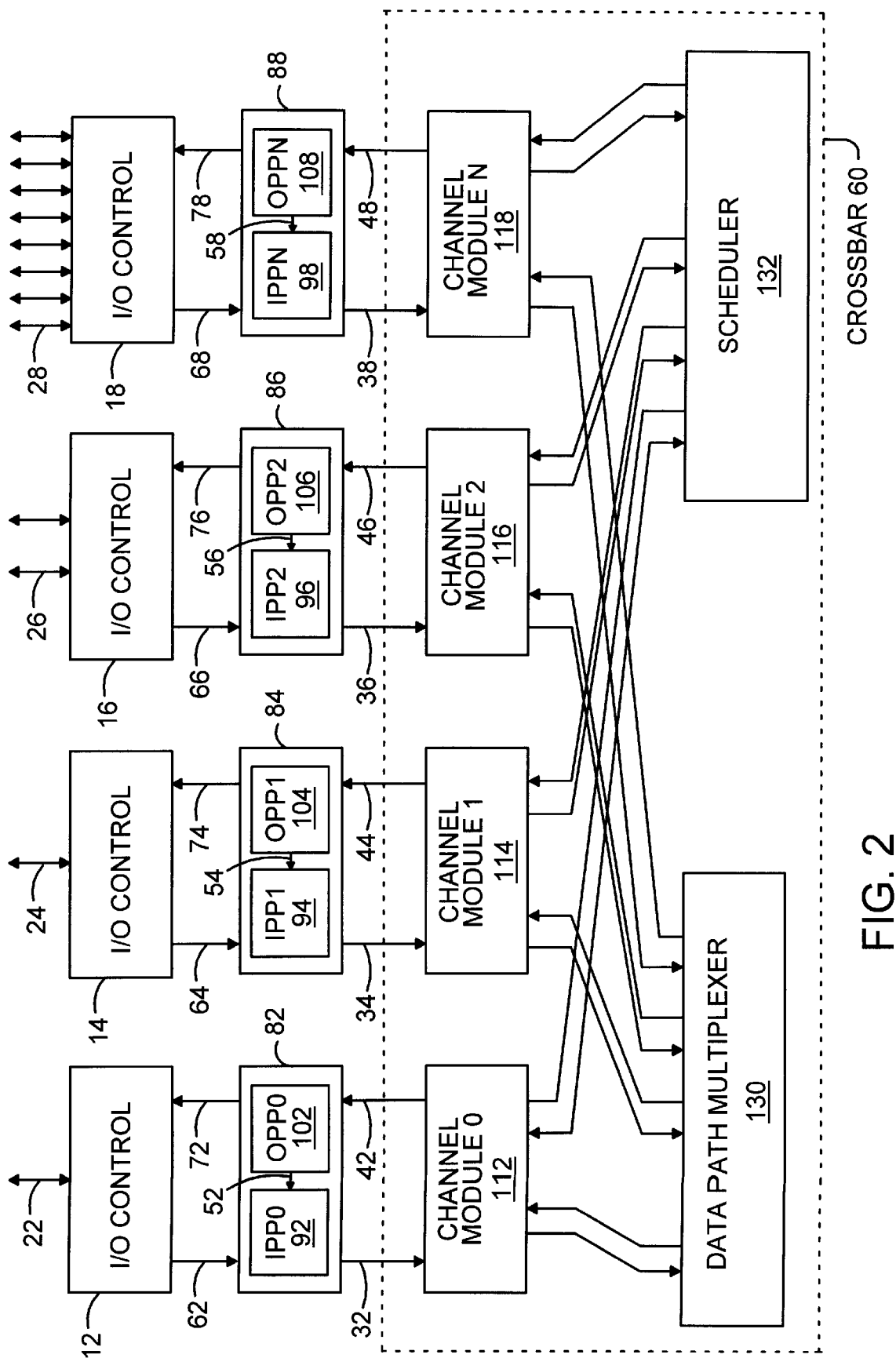
FIG. 2 is a depiction of the preferred architecture of a multiport switch in accordance with the invention.

FIG. 2 is a depiction of the preferred architecture of a multipoint switch that is compatible with network protocols such as ethernet and TCP/IP. Although a four-channel switch is shown for description purposes, the switch may have a different number of channels. The preferred architecture includes data links 22, 24, 26, and 28 connected to input/output (I/O) controllers 12, 14, 16, and 18. The I/O controllers are connected to channel-specific packet processing units 82, 84, 86, and 88 which are connected to channel modules 112, 114, 116, and 118 of a switch crossbar 60. The channel modules are connected separately to a data path multiplexer 130 and a scheduler 132. The preferred embodiment of the invention provides a method and apparatus for exchanging messages between the packet processing units and the crossbar that minimizes the number of connections needed between the packet processing units and the crossbar while enabling packets to be passed through the crossbar in an efficient manner.

The data links 22–28 connected to the I/O controllers 12–18 provide the medium for transferring packets of data into and out of the switch. In a preferred embodiment, the number of data links connected to each I/O controller is based on the bandwidth capacity of the data link. For example, in FIG. 2 the single and double data links 22, 24 and 26 represent 1,000 Megabits per second (Mbps) connections and the eight data links 28 represent 10 and/or 100 Mbps connections although these connection bandwidths can be smaller or larger. In addition, the physical makeup of the data links are preferably twisted pair wires and/or single mode optical fiber, although other data links such as coaxial cable, multi mode optical fiber, infrared, and/or radio frequency links are possible.

The I/O controllers 12–18 connected to the data links 22–28 and the packet processing units 82–88 provide the packet control between the data links and the internal switch fabric which includes the packet processing units and the crossbar 60. The I/O controllers receive incoming packets from the data links and transform the packets into digital data packets that are compatible with the switch. The I/O controllers also transmit data out onto the data links. The I/O controllers may buffer incoming and/or outgoing packets and the I/O controllers may perform some network traffic control. Finally, the I/O controllers supply the packet processing units via data paths 62, 64, 66, and 68 with packets for processing through the crossbar.

The packet processing units 82–88 are preferably broken up into input packet processors (IPPs) 92, 94, 96, and 98 and output packet processors (OPPs) 102, 104, 106, and 108. The IPPs manage packet traffic from the I/O controllers 12–18 and to the switch crossbar 60. More specifically, the IPPs receive packets from the I/O controllers in their original variable-length format and then segment the variable-length packets into fixed-length switching blocks before the switching blocks are sent to the crossbar via unidirectional data paths 32, 34, 36, and 38. The variable-length packets are segmented into fixed-length switching blocks to enable orderly and efficient transfer of packets through the crossbar. The majority of the data that makes up a particular switching block is data from an associated packet, but some of the data in the switching block is added header information that is used to transfer internal messages between the packet processors and the crossbar as part of an internal messaging protocol. The data and the messaging header are multiplexed together for simplicity of design and efficiency purposes.

Figure 3:
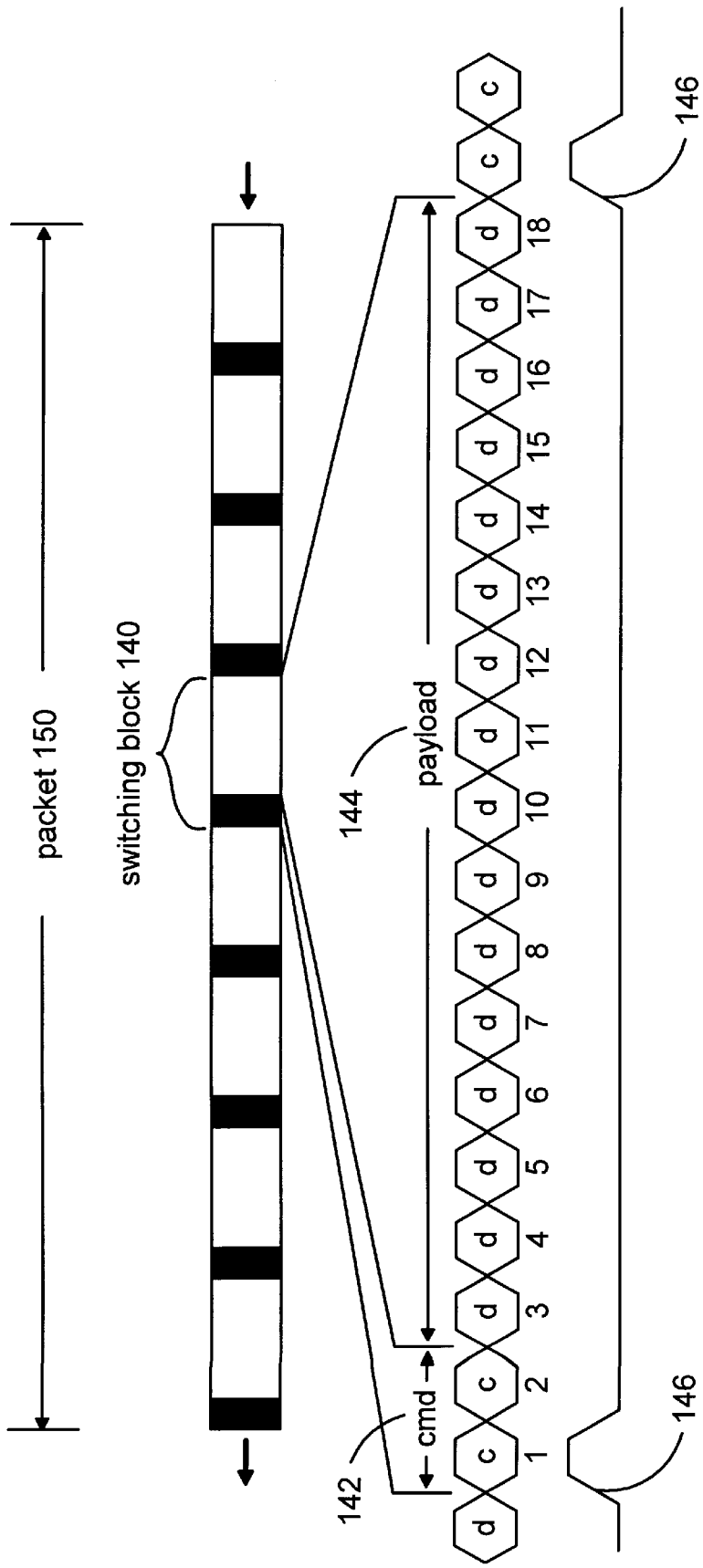
FIG. 3 is a depiction of a data packet and an expanded view of a switching block in accordance with the invention.

In the preferred embodiment, the fixed-length switching blocks generated by the IPPs consist of 36 bytes. Referring to FIG. 3, a variable-length packet 150 is segmented into multiple fixed-length, or finite, switching blocks and one expanded fixed-length switching block is shown for description purposes. Each 36-byte switching block consists of a 4-byte command header 142 and a 32-byte payload 144. Using 16-bit channels, each switching block is sent through the switch over eighteen clocks and a framing pulse 146 is used to indicate the termination of one switching block and the beginning of an adjacent switching block. Each command header consists of two fields. The first field is a request or response field that is used to exchange messages related to request arbitration. The first field is not related to the information in the second field or to the payload but instead to a subsequent packet that is awaiting transfer through the crossbar. When a switching block is traveling from an IPP to the crossbar, the first field in the command header is a request command, and when a switching block is traveling from the crossbar to an OPP, the first field in the command header is a response command, both of which are described in more detail below. The second field in the command header is a data identifier (dataID) that carries information related to the data in the attached payload. The first field and the second field of the command header do not necessarily utilize the same number of bits and the payload carries data that is part of a larger packet from which the payload was segmented.

Figure 4:
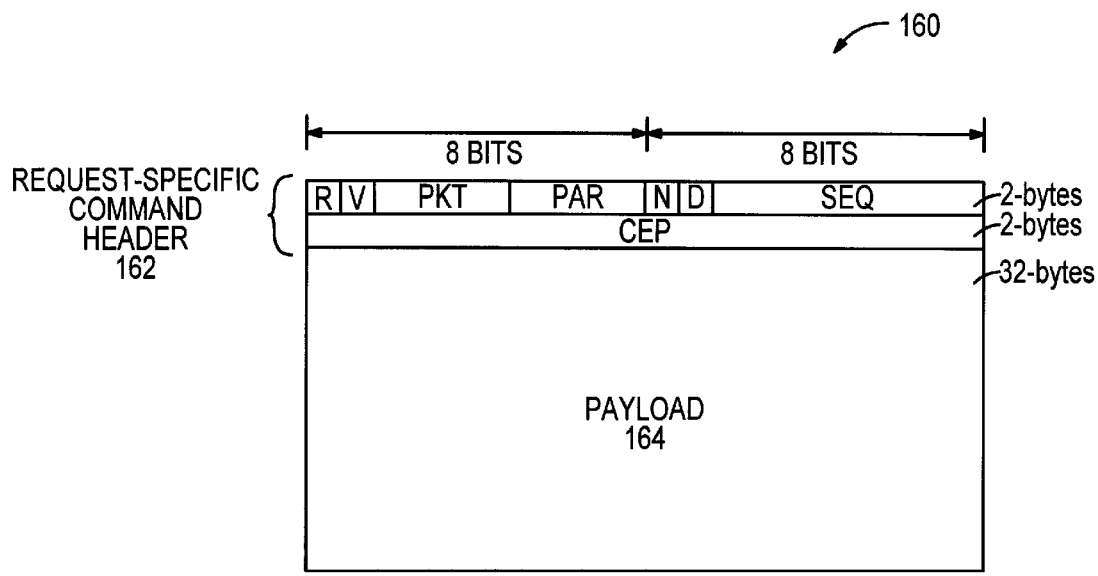
FIG. 4 is a depiction of a switching block including the fields within the request-specific command header in accordance with the invention.
Figure 5:
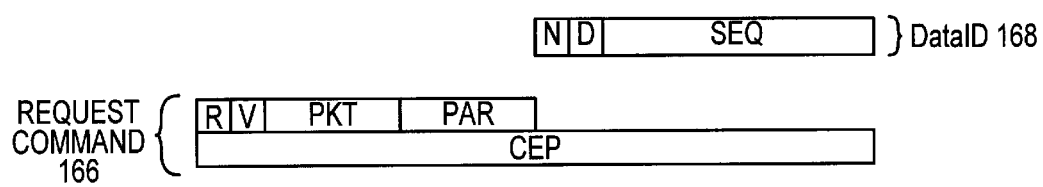
FIG. 5 is a depiction of the request command and data ID portions of the request-specific command header of FIG. 4 in accordance with the invention.

Referring back to FIG. 2, the IPPs 92–98 are responsible for generating the request commands and the dataIDs that are transmitted with a switching block from an IPP to the crossbar 60. FIG. 4 is a depiction of a switching block 160, as generated by an IPP, that includes a 4-byte request-specific command header 162 and a 32-byte payload 164. FIG. 5 identifies which portion of the request-specific command header forms the request command 166 and which portion of the header forms the dataID 168. The request command 166 of the command header is specific to a subsequent packet that is awaiting transfer through the crossbar and the dataID 168 is specific to the attached payload 164 that is part of the switching block. The specific vectors within the command header and the dataID are explained below in conjunction with the operation of the system.

Referring back to FIG. 2, the OPPs 102–108 receive fixed-length switching blocks from the crossbar 60 on unidirectional data paths 42, 44, 46, and 48 and reassemble the payload portions into the original variable-length packets for transfer to the I/O controllers 12–18. The OPPs may buffer switching blocks and/or packets before the packets are transferred to the I/O controllers. The OPPs are connected to the IPPs via bypass data paths 52, 54, 56, and 58 that allow messaging information to be transferred from the crossbar 60 to the IPPs 92–98.

The crossbar 60, which is identified by the dashed line, preferably consists of channel modules 112–118, a data path multiplexer 130, and a scheduler 132. The channel modules are channel-specific devices that are responsible for demultiplexing and multiplexing the response/request commands, the dataID, and the payload of each switching block. For a packet coming from an IPP to a channel module, the request command is demultiplexed from the switching block and the request command is sent to the scheduler, while the dataID and the payload are sent to the data path multiplexer. For a packet going from a channel module to an OPP, a response command generated from the scheduler is multiplexed with a dataID and a payload from the data path multiplexer. The channel modules also track, on a channel-specific basis, the number of switching blocks that have passed through the crossbar in order to track the beginning and end of new packets.

The data path multiplexer 130 is connected to all of the channel modules 112–118 and provides the physical paths for transferring the payload and dataID portions of switching blocks between channels of the crossbar. The preferred data path multiplexer has the ability to unicast and multicast the payload and dataID portions of switching blocks. In the preferred embodiment, the channel modules, the data path multiplexer, and the scheduler 132 are combined into a single integrated circuit (IC).

The scheduler 132 is connected to all of the channel modules 112–118 and utilizes the request commands transferred from the channel modules to manage traffic through the data path multiplexer 130 in a manner that maximizes the throughput of the switching blocks without unfairly delaying any particular switching block. The scheduler arbitrates among multiple request commands and then generates a response command for a command header. The response command identifies when a grant has been issued to a packet that is awaiting transfer through the crossbar.

Figure 6:
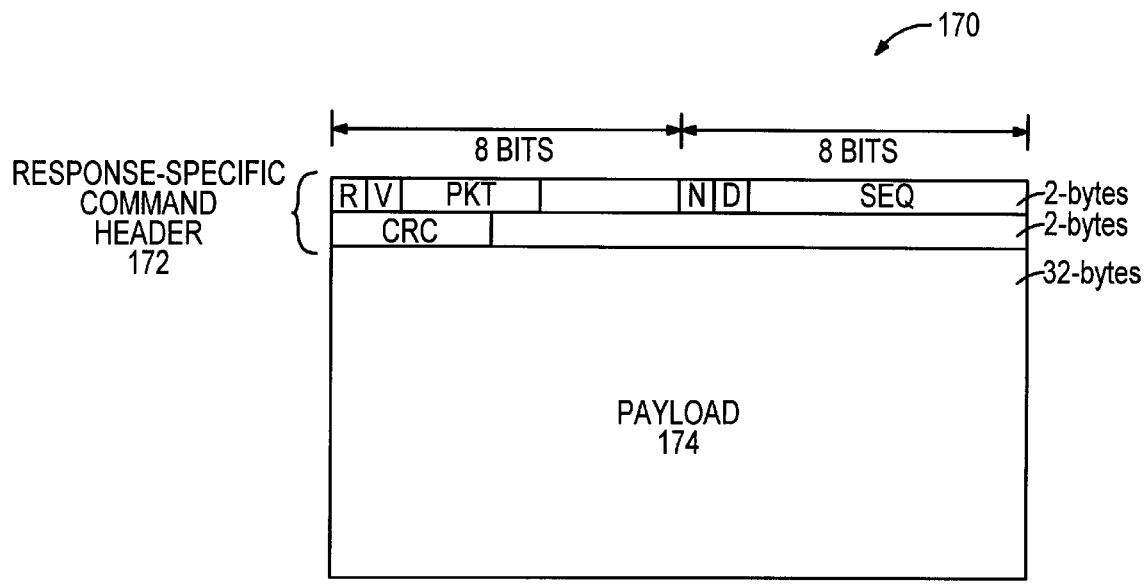
FIG. 6 is a depiction of a switching block including the fields within the response-specific command header in accordance with the invention.
Figure 7:
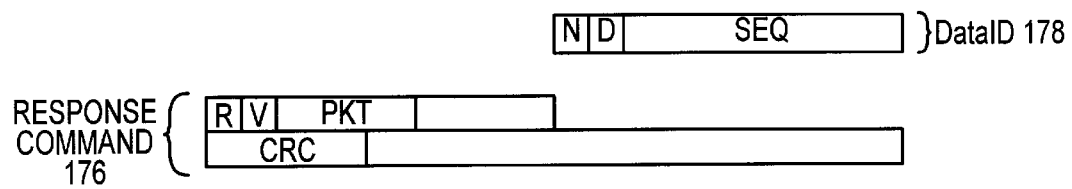
FIG. 7 is a depiction of the response command and data ID portions of the response-specific command header of FIG. 6 in accordance with the invention.

Response commands are generated by the scheduler 132, transferred to the related channel modules, and then multiplexed with dataID fields and payloads into a switching block 170, as shown in FIG. 6, to create response-specific command headers 172. Referring to FIG. 7, as with the request command, the response command 176 is not related to the dataID 178 or the payload 174 that make up a switching block. The specific vectors within the request-specific command header will be discussed in detail below in conjunction with the operation of the system.

In operation, switching blocks go through the crossbar in strict order, however there can be holes (switching blocks with no valid data) in the data stream during the transmission of a packet. Holes between the switching blocks typically occur when an IPP is momentarily not able to deliver valid data during the transfer of a packet due to momentary bandwidth conflicts. An output channel can be assigned to a new input channel only after the last switching block of the packet currently being transferred on the output channel is delivered. Once the crossbar delivers the first switching block of a packet to an output channel, the crossbar will continue delivering subsequent switching blocks from the same packet, or alternatively blank switching blocks, until the packet transfer is completed or aborted. Blank switching blocks act as markers to keep the channel available for the current transfer. Output channels must drop the current packet and start receiving a new packet if they get a first switching block of the new packet before they receive the final switching block of the current packet transfer.

In order to maximize the efficiency of the switching system, it is desirable to transfer packets through the crossbar one after another with minimal or no delay between packets. However, there are several different sources of delay that accumulate through different stages of packet transfer that make it difficult to transfer packets through the crossbar one after another. For example, "crossbar delay" is a delay that is mostly due to registers on the data path multiplexer. "Crossbar arbitration delay" is a delay that is caused by the arbitration between requests that is performed by the scheduler. "Transport" and "register delay across communications channels" are delays that originate from registers placed before pin drivers and after input buffers to simplify pin and/or board timing. For high speed serial data (HSSD) based implementations, serializers and deserializers can add four to eight extra clocks between transfers. "Arbitration delays" at the IPPs are delays that are caused by multiplexing packets from multiple data links onto one switch channel. "Data streaming delays" are delays between the IPPs and the packet memories generated during packet transfers.

In view of all of the different delays that occur during packet transfer, it is desirable to start the process of identifying new packets for transfer from the IPPs and through the crossbar before the time that new packets are actually needed at the crossbar, so that the new packets can be sent from the IPPs immediately after packets that are in the process of being transferred. This process is known as "pipelining" because packets are sent from the IPPs one after another without delay through the crossbar similar to the flow of fluid through a pipe. Complete pipelining provides the maximum bandwidth utilization of the data paths between the crossbar and the IPPs/OPPs.

Figure 8:
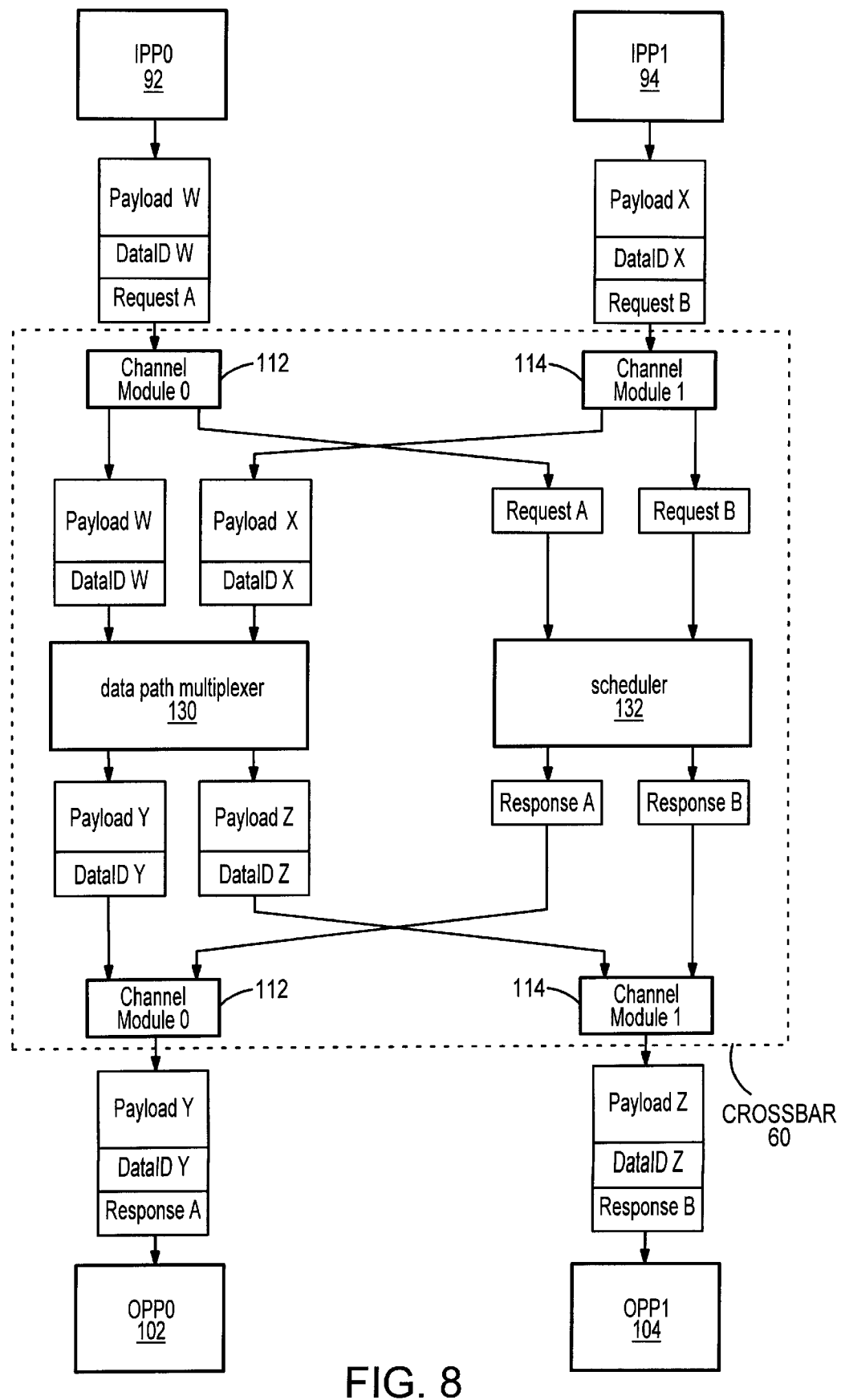
FIG. 8 is a depiction of the transfer of two requests and two responses via two channels of the switch of FIG. 2.

Referring back to FIG. 2, the preferred embodiment of the invention multiplexes requests and responses with payloads and dataIDs in order to minimize the number of connections between the packet processors and the crossbar and in order to enable the pipelining of variable-length packets from the IPPs 92–98, through the crossbar 60, and out to the OPPs 102–108. FIG. 8 is a depiction of a simplified flow of switching blocks from IPPs 0 and 1 to OPPs 0 and 1 in accordance with the invention.

In the example of FIG. 8, at IPP 0, 92, payload W, related dataID field W, and unrelated request command A are multiplexed together into a switching block and the switching block is transmitted from IPP 0 to the crossbar 60. The payload W and dataID W are destined to be switched by the crossbar and will likely emerge from the data path multiplexer 130 out of sync with request A. At IPP 1, 94, payload X, related dataID X, and unrelated request command B are multiplexed together into a switching block and the switching block is transmitted from IPP 1 to the crossbar. The payload X and dataID X are destined to be switched at the crossbar and will likely emerge from the data path multiplexer out of sync with request B. When the switching blocks arrive at their respective channel modules 112 and 114, the request commands A and B are demultiplexed from their respective payloads and dataIDs, W and X. The request commands from both switching blocks are sent to the scheduler 132 for arbitration and the dataIDs and payloads are sent to the data path multiplexer for switching. The dataIDs and payloads typically pass through the data path multiplexer in less time than it takes for the request commands to go through the arbitration process in the scheduler and, as a result, the dataID fields and payloads are most likely multiplexed with different responses upon exiting the crossbar.

Response commands A and B are generated by the arbitration process of the scheduler from respective request commands A and B and the response commands are output from the scheduler and transferred to the respective channel modules 112 and 114. At the channel modules, response commands A and B are multiplexed with new dataID fields and payloads, Y and Z respectively, to form complete switching blocks. The dataIDs and payloads are different from the dataIDs and payloads that the request commands originally traveled with because of timing differences between the time required for a payload to travel through the data path multiplexer 130 and the time required by the scheduler 132 for an arbitration cycle. The switching blocks that are formed by the channel modules are then transferred to the OPPs 102 and 104, where the response commands are passed to the respective IPPs via the bypass data paths and the payloads are reassembled into their original variable-length packets.

Figure 9:
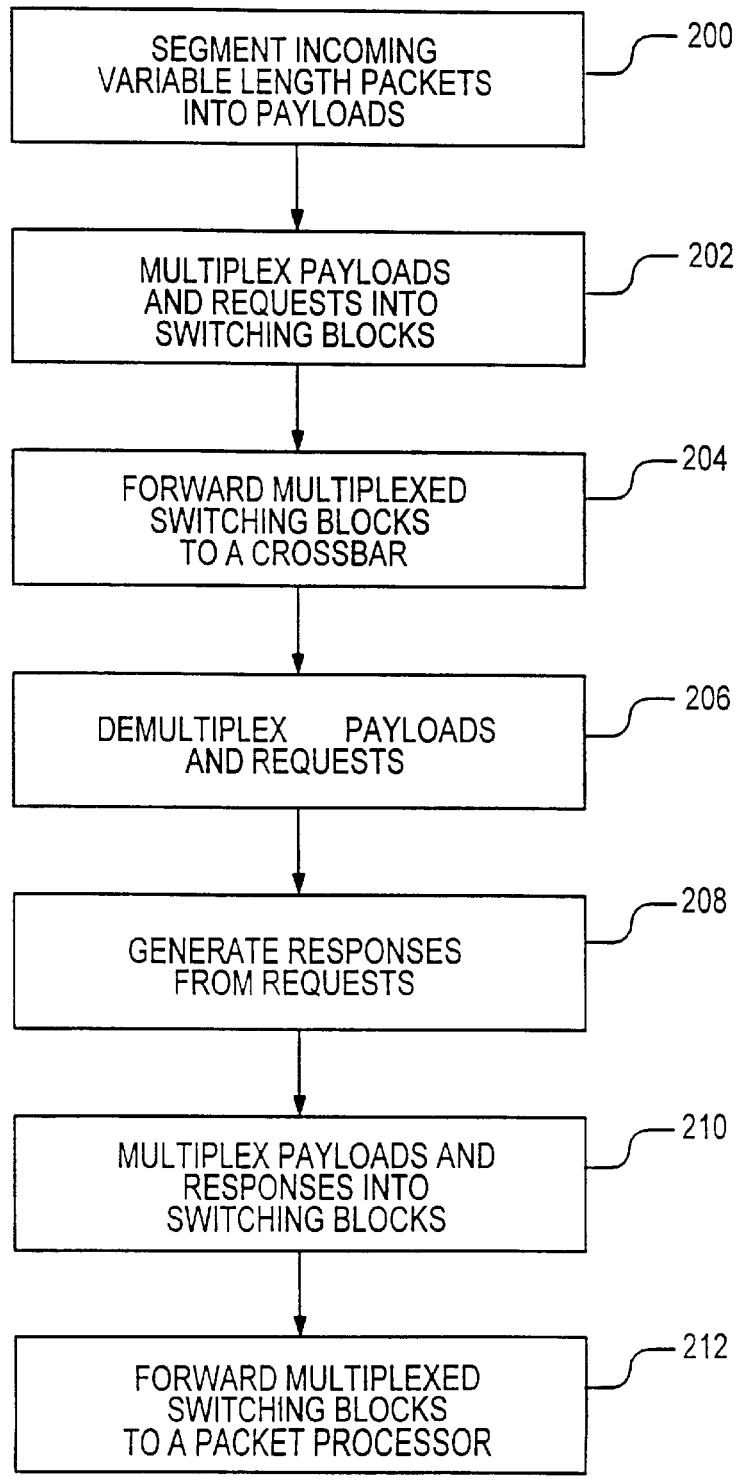
FIG. 9 is a process flow of a preferred method for forwarding variable-length packets in accordance with the invention.

FIG. 9 is a flow diagram of a preferred method of the invention. In a first step 200, incoming variable-length packets are segmented into payloads. In a next step 202, payloads and request information are multiplexed together into switching blocks. The request information in the switching blocks includes output channel destinations of a variable-length packet that is different from the variable-length packet related to the current payload transfer. In a next step 204, multiplexed switching blocks are forwarded to the crossbar of the switch. In a next step 206, the payload and request information of the switching block are demultiplexed so that the request information can be used by the crossbar for scheduling arbitration. In a next step 208, response information is generated from the request information. The response information indicates whether or not an awaiting variable-length packet can be forwarded through the crossbar. In a next step 210, the payload and response information are multiplexed together into switching blocks. In a next step 212, the multiplexed switching blocks are forwarded to a packet processor. In a preferred method, the payload segments and the switching blocks are fixed in length.

The information contained in the request commands, the response commands, and the dataID fields are important to ensuring that the pipelining of packets can occur. Referring back to FIGS. 4–7, the fields in the request-specific and response-specific command headers are now described in detail.

Referring specifically to FIGS. 4 and 5, the request-specific command header 162 includes the request command 166 and the dataID 168 field. The request command includes a channel reset vector, a valid request frame vector, a packet identified vector, a parity vector, and a crossbar exit port descriptor. The channel reset vector, R, is a 1-bit vector that when set clears the scheduler. The valid request frame vector, V, is a 1-bit vector that when set indicates to the scheduler that there is a request to send a new packet. The packet identifier vector, PKT, is a 3-bit vector that is used to match responses coming back from the crossbar to currently outstanding requests at the IPPs. The crossbar exit port descriptor vector, CEP, is a 16-bit vector that identifies the destination output channels of the packet associated with the request. During steady state operation, if the channel reset vector bit is set, the scheduler invalidates all of the queued requests related to the input channel, clears the channel's cumulative cyclic redundancy check (CRC) register, and at the next opportunity, the scheduler responds with R=0, V=0, and PKT=0. An IPP will typically assert the channel reset vector after detecting a CRC error in a response from the crossbar. Although it is possible to implement a protocol that can repeat requests and acknowledgments in the case of error detection, resetting the entire channel and starting again is a more desired implementation, since the error rate on the data channels is expected to be low enough to justify losing multiple requests and/or packets during error handling.

The header parity vector is also part of the request command. The header parity vector, PAR, is a 3-bit vector that is a checksum for the current request from the IPP. The header parity vector protects all of the other data in the request command. If an invalid parity value is received, the crossbar controller will ignore the request and issue a channel reset to the offending IPP. Parity is evaluated using the following equations:

$$par[2]=h_1[15]\oplus h_1[14]\oplus h_1[13]\oplus h_1[12]\oplus h_1[11]\oplus h_1[3]\oplus h_1[2]\oplus h_1[1]\oplus h_1[0]\oplus 1$$

$$par[1]=h_2[15]\oplus h_2[14]\oplus h_2[13]\oplus h_2[12]\oplus h_2[11]\oplus h_2[10]\oplus h_2[9]\oplus h_2[8]\oplus h_1[7]\oplus h_1[6]$$

$$par[0]=h_2[7]\oplus h_2[6]\oplus h_2[5]\oplus h_2[4]\oplus h_2[3]\oplus h_2[2]\oplus h_2[1]\oplus h_2[0]\oplus h_1[5]\oplus h_1[4]$$

The dataID 168 portion of the request-specific command header 162, which is similar in both the request-specific and response-specific command headers, has three separate vectors. The first dataID vector is a 1-bit beginning of new packet vector, N, that when set identifies the beginning of a new packet. The N vector is used by the OPPs for queue allocation and table look-up scheduling. The second dataID vector is a 1-bit validating frame vector, V, that when set, marks the payload within the switching block as valid. Since one or more output channels are allocated exclusively to one input channel for the duration of a packet transfer, the IPPs can send empty switching blocks by marking empty blocks with a "De-asserted" bit if, for example, the IPPs cannot supply switching blocks fast enough. The third dataID vector is a 6-bit cell sequence vector, SEQ, that is used to indicate which payload of a given packet is being transmitted or to indicate the end of a packet. The cell sequence vector is set to the total number of payload segments that make up the packet. A copy of the cell sequence vector is retained in the channel module and is decremented by one for each payload segment that is transferred through the crossbar. The cell sequence vector is also used by the OPP to determine the size of an incoming packet and the last payload segment of an incoming packet. The cell sequence vector is set to an artificial value when a blank switching block is inserted into a packet transfer. The artificial cell sequence value prevents the switch from determining that the current packet is completely transferred.

The crossbar cannot extend the transfer of switching blocks due to blank switching blocks or holes in the input switching block stream once the cell sequence vector reaches a threshold value that is used for end-of-packet detection. Any hole occurring after the cell sequence vector reaches the threshold value will be ignored and the switching block stream will be truncated as if there were no holes. It is assumed that the OPP will detect and discard these incomplete frames.

Referring to FIGS. 6 and 7, the response-specific command header 172 includes the response command 176 and the dataID 178 field. The response command includes a channel reset vector, a valid response frame vector, and an acknowledgment CRC vector. The channel reset vector, R, is a 1-bit vector that, when set, indicates that the messaging protocol is being re-initialized. The appropriate IPP should respond with a set channel reset vector of its own as an acknowledgment. After the exchange of channel resets, an initialization protocol is run between the crossbar and the appropriate IPP to synchronize the channel. Details of the initialization protocol are explained below. The valid response frame vector, V, is a 1-bit vector that indicates that a grant for a transmission at the next transmission time has been issued. Upon receiving a grant, the IPP is responsible for sending either valid switching blocks or blank switching blocks and a cell sequence vector set to the packet size in order to claim and keep the channel available. The packet identifier, PKT, is 3-bit vector that is used to match responses to the currently outstanding requests. Bits thirteen through eight of the first byte of the response command are also used to carry a frame adjustment count during the initialization protocol. Bits thirteen through eight may also be used to implement a pause function in an alternative embodiment.

In addition, the response command 176 includes a 4-bit acknowledge CRC vector, CRC, that protects the channel reset vector, the valid response frame vector, and the packet identifier vector of the response command. The following set of equations, which can detect all single and double bit errors, are used to evaluate the response acknowledge CRC vector:

$$crc[4] = \overline{h_1[15] \oplus h_1[14] \oplus h_1[13] \oplus h_1[12]}$$

$$crc[5] = \overline{h_1[15] \oplus h_1[11] \oplus h_1[10] \oplus h_1[9]}$$

$$crc[6] = h_1[14] \oplus h_1[13] \oplus h_1[11] \oplus h_1[10] \oplus h_1[8]$$

$$crc[7] = h_1[14] \oplus h_1[12] \oplus h_1[11] \oplus h_1[9] \oplus h_1[8]$$

The dataID field 178 of the response-specific command header 172 includes the same vectors as the dataID fields of the request-specific command header 162.

In order to ensure simple, fair, and efficient arbitration by the scheduler, the scheduler requires that all current requests and the state of all input and output channels be known before the next arbitration cycle starts. To ensure that all requests are accessible to the scheduler, the requests should be synchronized with the scheduler. Request synchronization ensures that all requests arrive at the crossbar at the same time and at fixed intervals. Request synchronization has the side effect of aligning the beginning of all data transfers, making management of the crossbar data path easier.

To accomplish request synchronization, the crossbar generates a framing pulse and distributes the pulse to all OPPs. The OPPs relay the framing pulse to their respective IPPs via the bypass data path. All of the IPPs go through a synchronization process which aligns the submission of their requests to the master framing pulse of the crossbar.

Figure 10:
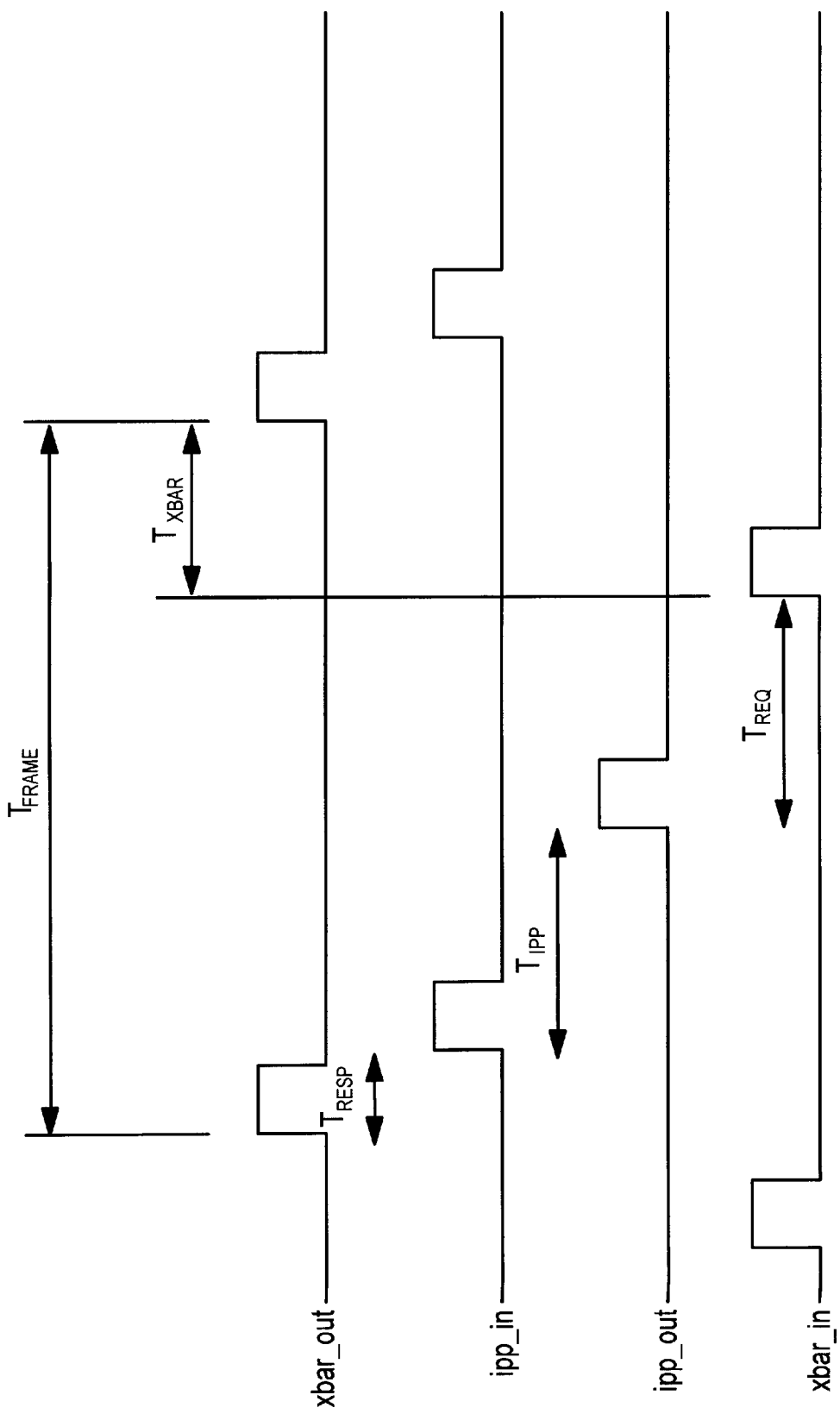
FIG. 10 is a depiction of exemplary minimum frame transmission time delays for a frame transmission cycle in an architecture as depicted in FIG. 2.

FIG. 10 is a depiction of the minimum frame transmission timing delays for a frame transmission cycle from release of a response by the crossbar to the transmission of the first related switching block through the data path multiplexer. The top time line (xbar_out) identifies the timing of the exit of a frame carrying a response (or grant) from the crossbar. The second time line (ipp_in) identifies the timing of the entrance of the same frame carrying the response into an IPP. The third time line (ipp_out) identifies the timing of the exit of a frame carrying a switching block related to the response from the IPP. The bottom time line (xbar_in) identifies the timing of the entrance of the frame carrying the switching block related to the response into the crossbar. In accordance with FIG. 9, $T_{RESP}$ is the minimum response propagation time from the crossbar through the OPP to the IPP. $T_{IPP}$ is the minimum time that the IPP takes to send a request and/or payload. $T_{REQ}$ is the minimum request and/or payload propagation time from the IPP to the crossbar. $T_{XBAR}$ is the minimum time for a payload to propagate through the crossbar, where $T_{XBAR}$ is strictly a function of the number of registers on the data path multiplexer. $T_{FRAME}$ is the amount of time necessary to transfer a switching block through the switch. To perform packet pipelining as described above, it is ideal when the timing delays fit the equation:

$$T_{RESP}+T_{IPP}+T_{REQ}+T_{XBAR}=N*T_{FRAME}$$

where N is preferably a positive integer that is calculated as described below and where $T_{FRAME}$ preferably equals eighteen clock cycles. When N is a positive integer, $T_{XBAR}$ can be fixed such that switching blocks will arrive at the crossbar in time to be pipelined with other switching blocks.

When all interfaces are operated at minimum delay, $T_{RESP}+T_{IPP}+T_{REQ}+T_{XBAR}$ is likely to be equal to a number of clocks less than $N * T_{FRAME}$. In order to properly synchronize the arrival of a switching block at the crossbar, delay can be added within the IPP (to $T_{IPP}$). Aligning the frame transmissions for each input can be achieved by having the crossbar scheduler force each IPP to delay its frame pulse a certain number of clocks. A preferred synchronization protocol is run during initialization, or each time a channel has been reset, wherein the request and response commands are utilized in a specific manner during the synchronization protocol. During the synchronization protocol, certain bits of the response and request commands are utilized, as shown in Table 1 and Table 2.

TABLE 1

RESPONSE COMMAND FIELDS DURING SYNCHRONIZATION

| Response Command | xbar_data[15] (RST) | xbar_data[14] (V) | xbar_out [13:8] | xbar_frame |
|---|---|---|---|---|
| Reset | 1 | 0 | 0 | inactive |
| Sync1 | 1 | 0 | 0 | active |
| Sync2 | 1 | 1 | <delay> | active |
| Standby | 0 | 0 | 0 | active |
| Online | 0 | X | X | active |

TABLE 2

REQUEST COMMAND FIELDS DURING SYNCHRONIZATION

| Request Command | ipp_data[15] (RST) | ipp_data[14] (V) | ipp_out[13:8] | ipp_frame |
|---|---|---|---|---|
| Reset | 1 | 0 | 0 | inactive |
| Sync1 | 1 | 0 | 0 | active |
| Sync2 | 1 | 1 | <delay> | active |
| Standby | 0 | 0 | 0 | active |
| Online | 0 | X | X | active |

Figure 11:
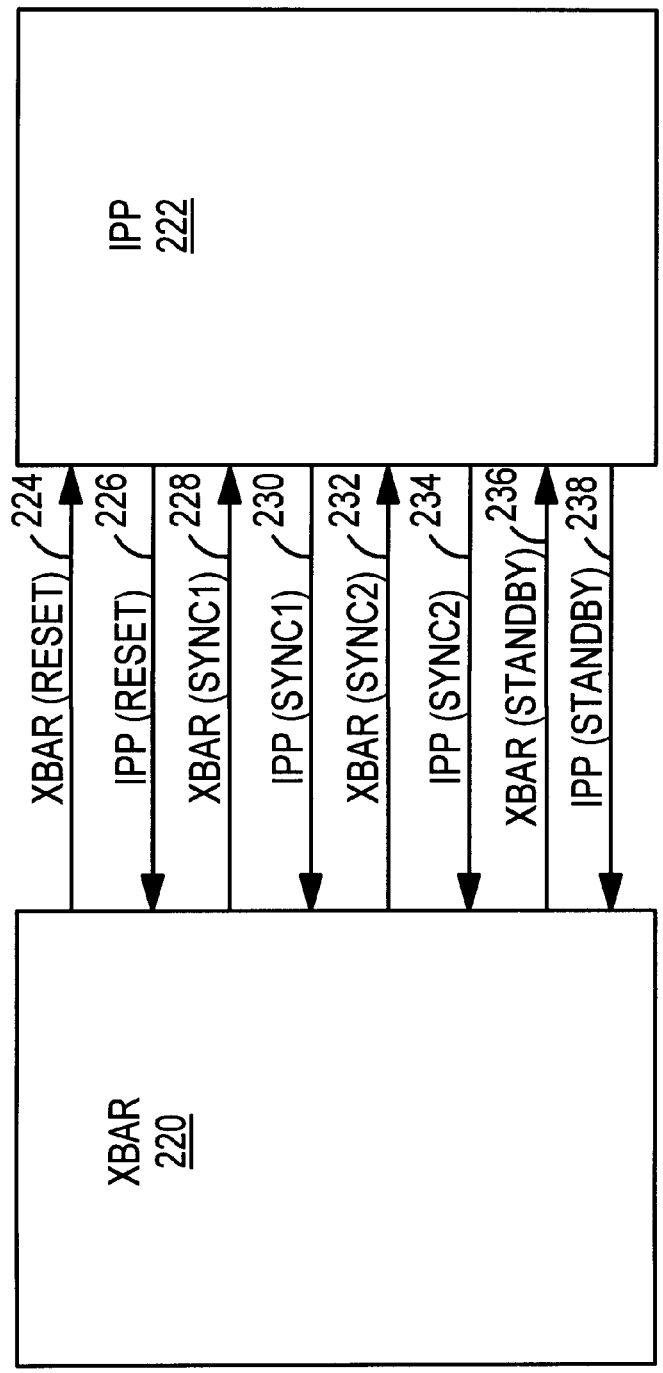
FIG. 11 is a depiction of the channel synchronization process that is carried out between the crossbar and an IPP in a switch with the architecture of FIG. 2.

FIG. 11 is a depiction of the channel synchronization process that is carried out between the crossbar 220 and an IPP 222 using the command fields from Tables 1 and 2. To initiate the synchronization process, both the crossbar and the IPPs exchange Reset commands 224 and 226. During a reset, all of the IPPs in the system turn off their frame pulse, set their frame pulse delay to some minimum value, and wait for a frame pulse from the crossbar marked with a Sync1 command. When an IPP receives a Sync1 command 228 and a framing pulse from the crossbar, the IPP turns on its own framing pulse and sends its own Sync1 command 230 to the crossbar. When the crossbar receives the returning frame pulse from the IPP, it determines how many cycles the IPP must delay its frame transmission to align with the crossbar frame timing.

The crossbar 220 then sends another frame to the IPP 222 with a Sync2 command 232, which includes the additional required delay. The IPP responds to the Sync2 command from the crossbar with its own Sync2 command 234 to the crossbar that echoes the delay value. At this time, the IPP requests should be aligned to the crossbar's frame timing. Upon receipt of the Sync2 command from the IPP, the crossbar resets its internal queues and is ready to receive requests from the IPP.

Finally, the crossbar 220 sends a Standby command 236 to the IPP 222 and starts a frame counter. When the IPP receives the Standby command, the IPP responds with at least one empty Standby request 238. The crossbar measures the delay between the Standby command it sent and the first incoming Standby command from the IPP and uses the determination of latency to program a packet transfer completion detection threshold that represents the delay that must be accounted for so that the crossbar scheduler can correctly pipeline packet transfers.

In order to correctly pipeline packet transfers, the crossbar must know the total delay time from the issuance of a request from an IPP to the arrival of the switching block that is related to the request at the crossbar. The delay time from issuance of a request to arrival of a switching block can be simply stated as:

$$T_{REQUEST} + T_{GRANT}$$

where $T_{REQUEST}$ equals the delay from the issuance of a request from the IPP until the delivery of the response for that request at the IPP, and where $T_{GRANT}$ equals the delay from the delivery of the response to the IPP by the crossbar until the appearance of the frame carrying the first switching block of that transfer at the crossbar. To ensure full pipelining, a channel synchronization protocol with the following relationship must be followed:

$$T_{REQUEST} + T_{GRANT} = k * T_{FRAME}$$

where k equals 1, 2, 3 . . . .

Figure 12:
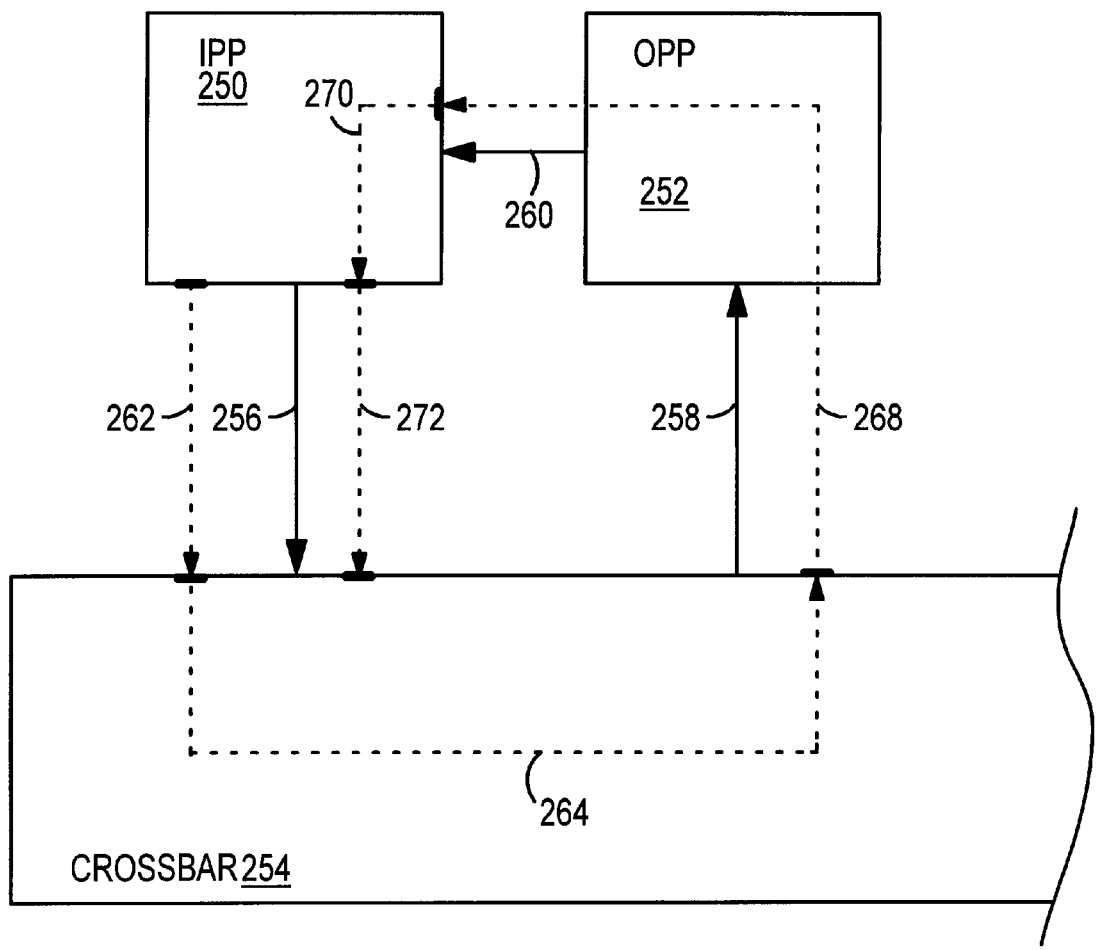
FIG. 12 is a depiction of the timing intervals for a single transaction cycle.

In a preferred case, where $T_{FRAME}$ equals eighteen clocks and k equals three, the number of clocks allotted to $T_{REQUEST}$ and $T_{GRANT}$ are shown in Table 3 and depicted in FIG. 12. FIG. 12 depicts an IPP/OPP 250 and 252 pair and the associated crossbar 254, where the solid lines represent the physical data links 256, 258 and 260 between the three elements and the dashed line segments correspond to the transactions of Table 3.

TABLE 3

TRANSACTION BUDGETS FOR k = 3

| | | |
|---|---|---|
| $t_{REQUEST}$ | IPP request to propagate to XBAR | 2 Clocks |
| | XBAR to perform arbitration and generate grant | 22 Clocks |
| $t_{GRANT}$ | XBAR grant to propagate to IPP | 4 Clocks |
| | IPP grant receipt to first data cell out of IPP | 24 Clocks |
| | Data cell to propagate from IPP to XBAR | 2 Clocks |

The frame transmission cycle begins with a first transaction 262 of a request propagating in two clocks from the IPP 250 to the crossbar 254. In a next transaction 264, the crossbar 254 incorporates the request in an arbitration cycle that consumes twenty-two clocks. After the arbitration cycle, in a next transaction 268 a response with a set valid response frame vector is issued from the crossbar and the response travels through the OPP and to the IPP in four clocks. After the grant is received by the IPP, in a next transaction 270 the IPP consumes twenty-four clocks before the first switching block containing the payload associated with the received response exits the IPP. In a next transaction 272, the switching block containing the payload associated with the received response takes two clocks to propagate from the IPP to the crossbar. Restated, from the time a request is issued from the IPP to the time the first related switching block arrives at the crossbar, fifty-four clocks will expire. As a result, in order to achieve full pipelining of packets through the switch, a request must be issued from the IPP fifty-four clocks before the end of the current packet transfer.

In accordance with the protocol of the invention, the number of clocks is translated into a number of switching blocks. The number of switching blocks represents the minimum number of switching blocks that can be left in the current packet transfer before a request must be released from the related IPP in order to maintain full pipelining. The number of switching blocks is referred to as the packet transfer completion detection threshold.

In the example, since k is an integer multiple of $T_{FRAME}$ where k=3, it can be said that a request for a new packet must be issued from the IPP at the point that the third from the last switching block from the current packet transfer reaches the crossbar. The cell sequence vector, SEQ, of the dataID field is used to track the switching blocks for each packet transfer, such that when the vector reaches the value "2," the packet transfer completion detection threshold is met and the process of supplying a new packet to the crossbar is begun.

Figure 13:
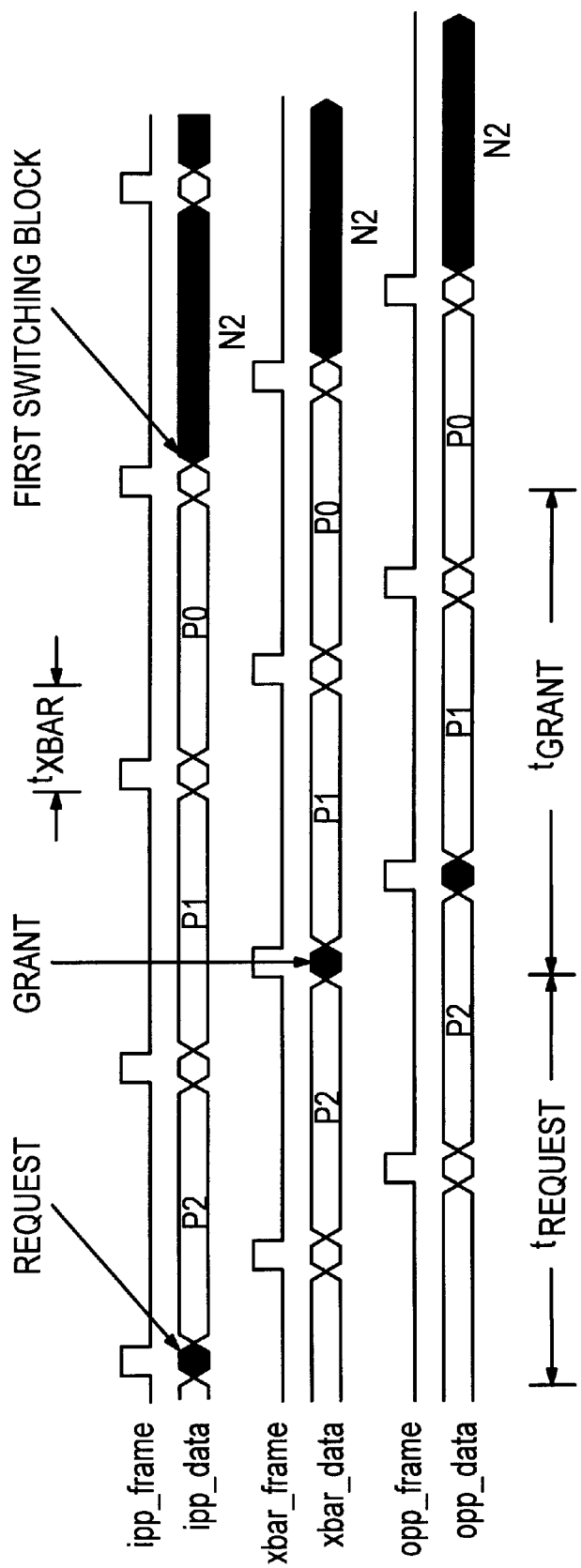
FIG. 13 is a depiction of various waveforms for a pipelined packet transfer in the case where k=3 in accordance with the invention.

FIG. 13 is a depiction of various waveforms for a pipelined packet transfer in the case where k=3. The first pair of waveforms represents the frame pulses and request commands exiting an IPP. The second pair of waveforms represents the frame pulses for the crossbar output in relation to the response (grant) that is issued for the request from the first pair of waveforms. The third pair of waveforms represents the frame pulses for the OPP and the grant that was issued from the crossbar. As can be seen, the first switching block related to the issued request trails the related request by three frames, or fifty-four clock periods.

For the general case, $T_{REQUEST}$ is a fixed constant for each crossbar implementation and $T_{GRANT}$ is discovered during the initial synchronization process. After the initial synchronization process is complete for an input channel, the crossbar controller adds $T_{GRANT}$ and $T_{REQUEST}$, converts the number of clocks to a whole number of frames, k (which becomes the packet transfer completion detection threshold), and stores the threshold so that it can be compared against the cell sequence, SEQ, field of each frame to decide when an IPP should issue a request and when the scheduler should start arbitrating for the next transfer of a packet on the channel.

What is claimed is:

1. A method for forwarding variable-length packets between channel-specific packet processors and a crossbar of a multiport switch comprising the steps of:

segmenting incoming variable-length packets into finite payloads;

multiplexing said payloads and request information together to form first switching blocks, wherein said request information in each said switching block includes an indication of an output channel destination of an awaiting variable-length packet that is different from the variable-length packet related to said payload with which said request information is multiplexed;

forwarding said multiplexed switching blocks containing request information to said crossbar;

demultiplexing said payloads from said request information such that said request information can be used within said crossbar for scheduling arbitration;

generating response information from said request information, wherein said response information indicates whether or not a particular awaiting variable-length packet can be forwarded to said crossbar;

multiplexing said payloads and said response information together to form second switching blocks; and forwarding said multiplexed second switching blocks containing response information to a designated packet processor.

2. The method of claim 1 wherein said step of multiplexing said payloads and said request information together into first switching blocks includes a step of multiplexing data identification information related to said payload into said switching blocks, wherein said data identification information contains a vector that allows switching blocks of a specific variable-length packet to be tracked.

3. The method of claim 2 further including the steps of:
decrementing said vector for each switching block of said specific variable-length packet that is transferred through said crossbar; and
multiplexing a request for a new packet when said vector indicates that said specific variable-length packet transfer through said crossbar is near completion.

4. The method of claim 1 further including the steps of:
tracking the time left to forward a current variable-length packet through said crossbar;
multiplexing payloads related to said particular awaiting variable-length packet with request information into awaiting first switching blocks when said tracking indicates that said current variable-length packet has been forwarded from said designated packet processor; and
forwarding said awaiting first switching blocks related to said particular awaiting packet directly after completion of said forwarding of said first switching blocks related to said current variable-length packet.

5. The method of claim 4 wherein said step of tracking includes a step of counting the number of first switching blocks related to said current variable-length packet that remain to be transferred through said crossbar.

6. The method of claim 1 further including the steps of:
determining a first delay from the submission of request information by a packet processor until the delivery of related response information to said packet processor; and
determining a second delay from the delivery of response information to said packet processor until the appearance of a first switching block carrying a payload related to said response information at said crossbar.

7. The method of claim 6 further including the steps of:
adding said first delay and said second delay to obtain a total clock cycle delay; and
issuing a request from said packet processor for a new packet to be forwarded no later than the time interval represented by said total clock cycle delay before the end of a current packet that is being forwarded through said crossbar.

8. A multiport switch having a multichannel switch fabric for switching variable-length packets comprising:
means for supplying a crossbar with a first combination of a first payload and an unrelated request from a packet processing unit over a first data connection, wherein said first payload includes data from a first packet and said unrelated request includes forwarding information associated with a third packet; and
means for supplying said packet processing unit with a second combination of a second payload and an unrelated response from said crossbar over a second data connection, wherein said second payload includes data from a second packet and said unrelated response includes forwarding information associated with said third packet.

9. The multiport switch of claim 8 further including means for segmenting variable-length packets to fixed-length payloads.

10. The multiport switch of claim 9 further including means for determining when a segmented variable-length packet will be completely forwarded through said crossbar.

11. The multiport switch of claim 10 further including means for determining a delay time between the release of a request from said packet processing unit and the arrival of a first switching block related to said request at said crossbar.

12. The multiport switch of claim 8 further including means for pipelining through said crossbar a second series of switching blocks from a fourth packet with a series of switching blocks from said first packet that is currently being transferred through said crossbar, wherein said first combination is one of said switching blocks.

13. The multiport switch of claim 8 wherein said means for supplying said crossbar includes an input packet processor that is connected to said crossbar by a physical connection that carries said first combination of said first payload and said unrelated request, wherein said input packet processor includes a multiplexer for outputting said first combination as a switching block that includes said first payload and said unrelated request.

14. The multiport switch of claim 13 wherein said means for supplying said packet processing unit includes a physical connection between said crossbar and an output packet processor that carries said second combination of said second payload and said unrelated response, wherein said crossbar includes a multiplexer for outputting said second combination as a switching block that includes said second payload and said unrelated response.

15. The multiport switch of claim 14 wherein said crossbar includes channel-specific channel modules, each having a demultiplexer and a multiplexer, wherein said demultiplexer has an input for receiving a multiplexed payload and unrelated request and has two separate outputs for transmitting said payload and said unrelated request, and wherein said multiplexer has two separate inputs for receiving a payload and an unrelated response and has a single output for transmitting a switching block that includes said payload and said unrelated response.

16. A method for controlling the flow of variable-length packets through a multichannel switch fabric of a multiport switch wherein said multichannel switch fabric includes channel-specific packet processing units and a crossbar, wherein said crossbar includes a data path multiplexer and a scheduler, comprising the steps of:
segmenting a first incoming variable-length packet into fixed-length payloads;
multiplexing header information with at least one of said fixed-length payloads to create a first fixed-length switching block, wherein said header information includes a request header that is related to a second incoming variable-length packet, said request header indicating at least one destination output channel of said second variable-length packet;
forwarding said first fixed-length switching block via a switch channel to said crossbar of said multiport switch;
demultiplexing said fixed-length payload from said request header;
forwarding said fixed-length payload to said data path multiplexer of said crossbar; and
forwarding said request header to said scheduler of said crossbar;

generating first response information from said request header that is related to said second variable-length packet, wherein said response information indicates whether or not said second variable-length packet can be forwarded through said crossbar;

multiplexing said fixed-length payload from said first fixed-length switching block with second response information that is unrelated to said first incoming variable-length packet to create a second fixed-length switching block;

forwarding said second fixed-length switching block to a packet processor of said multiport switch;

multiplexing said first response information related to said second variable-length packet with a second fixed-length payload that is unrelated to said second variable-length packet to create a third fixed-length switching block; and forwarding said third fixed-length switching block to said switch channel from which said first switching block was forwarded.

17. The method of claim 16 wherein said step of multiplexing header information includes steps of:

multiplexing a data identification header with said first fixed-length switching block, wherein said data identification header includes a cell sequence vector that indicates the number of payload segments that remain to be transferred in said first incoming variable-length packet; and decrementing said cell sequence vector each time a payload related to said first incoming variable-length packet is forwarded through said crossbar.

18. The method of claim 17 further including steps of:

establishing a packet transfer completion detection threshold that indicates the minimum number of payload segments that remain to be transferred before new header information is multiplexed with a payload; and multiplexing said new header information with a payload from said first incoming variable-length packet when said cell sequence vector of said payloads that are related to said first incoming variable-length packet is equivalent to said packet transfer completion detection threshold.

19. The method of claim 16 further including steps of:

synchronizing switching block transmission timings between a channel-specific processor and said crossbar on a channel-by-channel basis; and using said synchronized switching block transmission timings to establish a packet transfer completion detection threshold on a channel-by-channel basis.

20. The method of claim 19 further including steps of:

tracking the number of switching blocks that are left to be transferred where said tracked switching blocks are related to a packet that is currently being transferred; and issuing a request from a packet processor when said tracking indicates that said number of switching blocks that are left to be transferred is equal to said packet transfer completion detection threshold.

* * * * *